United States Patent [19]

Simme

[11] Patent Number: 4,944,545
[45] Date of Patent: Jul. 31, 1990

[54] STANCHION FOR GOODS VEHICLES

[76] Inventor: Sture B. R. Simme, Maratongatan 39, Lidköping, Sweden, S-531 52

[21] Appl. No.: 424,210

[22] PCT Filed: Apr. 26, 1988

[86] PCT No.: PCT/SE88/00210
§ 371 Date: Oct. 13, 1989
§ 102(e) Date: Oct. 13, 1989

[87] PCT Pub. No.: WO88/09282
PCT Pub. Date: Dec. 1, 1988

[30] Foreign Application Priority Data

May 19, 1987 [SE] Sweden ................... 8702069

[51] Int. Cl.$^5$ ............................. B62D 33/023
[52] U.S. Cl. ....................... 296/43; 105/380; 52/731
[58] Field of Search ............. 296/36, 43; 105/380, 105/382; 52/731, 727

[56] References Cited

U.S. PATENT DOCUMENTS

| | | | |
|---|---|---|---|
| 3,420,016 | 1/1969 | Findlay | 52/731 X |
| 3,420,032 | 1/1969 | Felt | 52/731 |
| 3,601,946 | 8/1971 | Rothemund | 52/731 |
| 3,868,804 | 3/1975 | Tantlinger | 52/731 X |
| 4,718,213 | 1/1988 | Butterfield | 52/731 |
| 4,760,682 | 8/1988 | King | 52/731 |

FOREIGN PATENT DOCUMENTS

| | | | |
|---|---|---|---|
| 5120 | 10/1979 | European Pat. Off. | 296/181 |
| 2313041 | 10/1973 | Fed. Rep. of Germany | 52/731 |
| 2258502 | 8/1975 | France | 52/731 |

Primary Examiner—Margaret A. Focarino
Assistant Examiner—Gary C. Hoge
Attorney, Agent, or Firm—Laurence R. Brown

[57] ABSTRACT

A stanchion for goods vehicles is made up of at least two sections (4, 6) which are preferably made of aluminum and are provided with cooperating ridges (5) and grooves (7) for guiding and transmission of forces. A strengthening section (8) can be inserted in the most stressed part of the stanchion.

6 Claims, 1 Drawing Sheet

U.S. Patent    Jul. 31, 1990    4,944,545
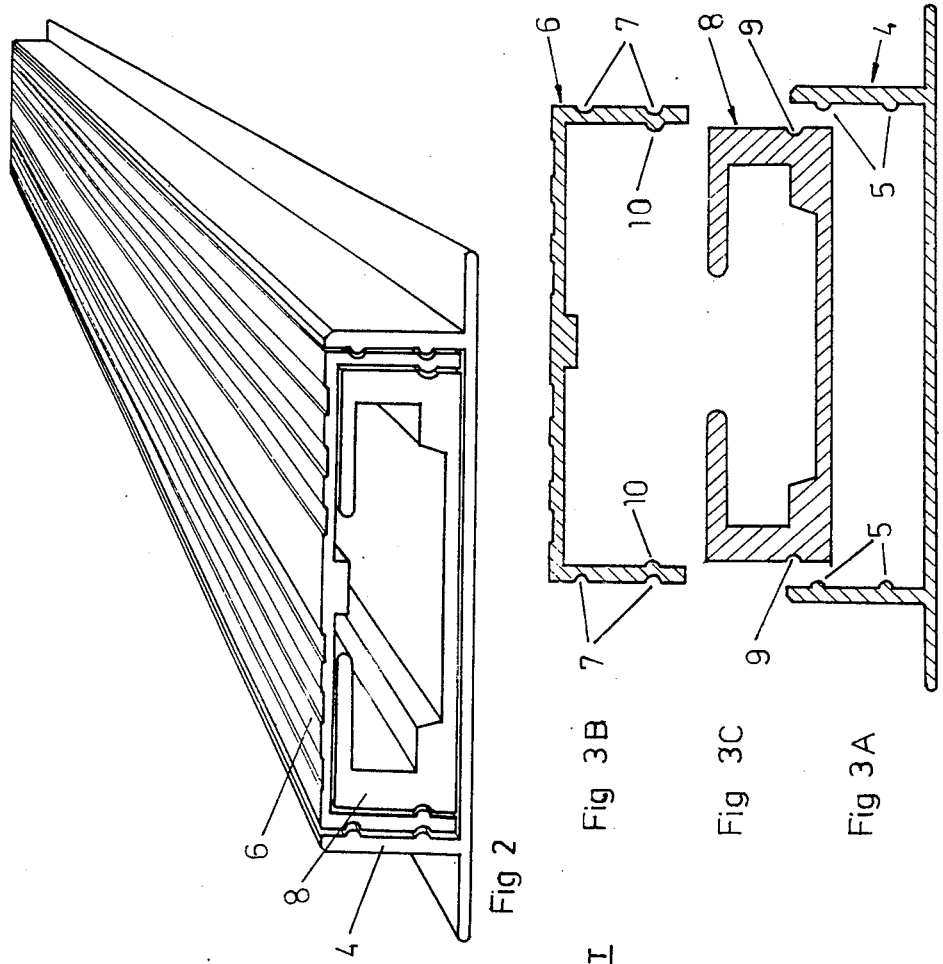
Fig 2
Fig 3B
Fig 3C
Fig 3A
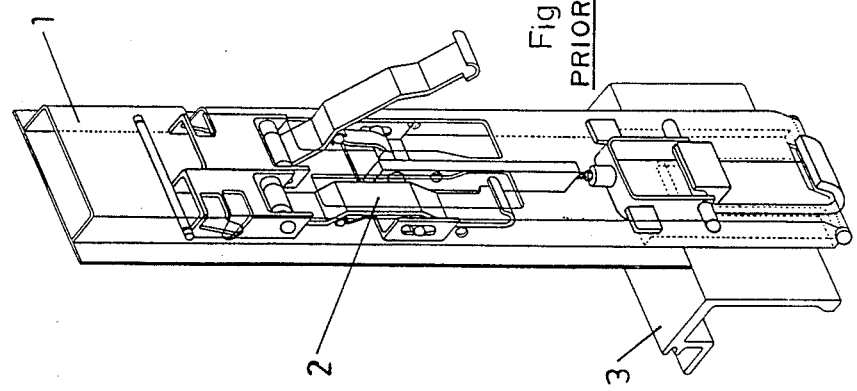
Fig 1
PRIOR ART

STANCHION FOR GOODS VEHICLES

TECHNICAL FIELD

The present invention relates to a stanchion for goods vehicles.

PRIOR ART

Stanchions for goods vehicles have hitherto normally been made of bent steel plate welded together to form a box containing the mechanism which is required for operating the stanchion. Such a stanchion is heavy, expensive to produce (as a result of bending, welding and surface treatment) and is not easy to service.

Technology has hitherto been lacking for producing stanchions from materials such as aluminium which afford clear advantages with respect to weight and freedom from requirements of surface treatment.

THE INVENTION

A stanchion according to the invention is made up of at least two sections which are preferably made of aluminium and are provided with cooperating, longitudinal ridges and grooves for guiding when pushing the sections together axially to form a stanchion and for transmission of forces during use, wherein a mechanism known per se for operating the stanchion can be arranged in a space formed by the sections.

A strengthening section of the same character as the other sections can be inserted in the stanchion at its most stressed part.

The sections can be held together simply by screws, rivets or similar elements.

BRIEF DESCRIPTION OF THE DRAWING

The invention will be described in greater detail below with reference to the attached drawing, in which FIG. 1 shows a previously known stanchion for a goods vehicle, FIG. 2 is a perspective view of a stanchion according to the invention, and FIGS. 3A-C are cuts through three sections incorporated in this stanchion.

DESCRIPTION OF A PREFERRED EMBODIMENT

FIG. 1 shows a previously known stanchion 1 for goods vehicles. With the aid of a mechanism, which is generally designated 2, the stanchion can, on the one hand, be releasably fixed on a platform edge 3 and, on the other hand, releasably fix flaps (not shown) in the raised position. Since the figure, which is taken from European Patent No. 0 090 835, is primarily intended to illustrate the mechanism 2 in the stanchion, the stanchion 1 itself is in fact only indicated.

Such a conventional stanchion is, after assembly of the mechanism, normally welded together by two steel sections—a level base section and a U-shaped section. The stanchion is heavy and thus difficult to handle, in addition to the fact that its weight limits in a prejudicial manner the possible net load of the vehicle. The welding makes the stanchion expensive. The steel plate material used means that rust protection and surface treatment are required. Finally, servicing the mechanism is difficult to carry out, as a result of the welding.

A stanchion according to the invention, which is shown in FIG. 2 and FIGS. 3A-C, is instead made up of sections preferably made of aluminium or the like, which sections can be simply inserted into each other in their longitudinal direction by virtue of the fact that they are equipped with cooperating ridges and grooves. Moreover, since all the essential parts of the mechanism can be made of aluminium, great advantages are achieved in the abovementioned respects.

FIG. 3A shows a base section 4 which can be said to consist of a base plate and two legs which project upwards therefrom and which are in each case provided, on their surfaces facing each other, with two longitudinal ridges 5. The result is a U section with protruding flanges against which the flaps of the goods vehicle are intended to bear in the raised position.

FIG. 3B shows a covering section 6 which can be said to consist of a plate, where appropriate channelled on the top side, and two legs which project downwards therefrom and which are in each case provided, on their surfaces facing away from each other, with two longitudinal grooves 7.

The base section 4 and covering section 6 can be fitted together to form a stanchion for a goods vehicle by being pushed together axially, in which connection the ridges 5 and grooves 7 cooperate in a guiding manner and, during subsequent use on a goods vehicle, also to transmit forces.

A mechanism 2 suitable for the purpose and which can have the design indicated in FIG. 1 or can be of any other construction is of course inserted in the stanchion during assembly, in which connection either one or both of the sections are provided beforehand with the necessary holes and recesses for the mechanism.

In particularly stressed parts of the stanchion, especially in connection with the platform edge 3, additional strengthening may be required. For this purpose it is possible to use a strengthening section 8, shown in FIG. 3C, which can be said to consist of a base plate, two legs projecting upwards therefrom, and two flanges directed inwards from the tops of these legs, so that an essentially box-shaped section is formed. The section can be strengthened, as shown, in the particularly stressed transition point between the base plate and the respective leg. The outside of the respective leg is provided with a longitudinal groove 9 for cooperation in the abovementioned manner, during assembly and subsequent use, with corresponding ridges 10 on the inside of the legs of the covering section 6. After assembly this strengthening section 8 can also be fixed by means of screws or rivets.

FIG. 2 shows, from the end (lower end), a stanchion made up of the three sections 4, 6 and 8, in which connection, as mentioned above, the strengthening section 8 extends along only part of the stanchion. This figure clearly shows the cooperation between the above-described ridges and grooves of the various sections.

In order to illustrate the difference in weight between a conventional stanchion made of welded steel plate and an aluminium stanchion according to the invention, it is pointed out that one meter of the former can weigh in the order of 15 kg, while the same length of the latter weighs only about 6.5 kg. It goes without saying that considerable advantages are obtained with respect to manageability and weight utilization.

Modifications are possible within the scope of the subsequent patent claims. Thus, both the shape and the positioning of the ridges and grooves may vary, and this also applies to the sections.

I claim:

1. A stanchion for mounting to extend vertically from a platform edge of a goods transport vehicle to bear weight along its length from goods being transported having a centrally located space for encompassing an internally mounted mechanism for releasably securing the stanchion in place, comprising in combination, at least two interfitting sections for forming a rectangular cross section configuration longitudinally overlapping in locked registration along two shorter dimensioned opposite sides to form a structure surrounding said space, with interlocking weight-bearing means comprising in each of the two sides a plurality of longitudinally disposed mated ridge-groove members that extend substantially along the length of the stanchion in overlapping portions of the sections.

2. The stanchion defined in claim 1 further comprising sections of aluminium.

3. The stanchion defined in claim 1 further comprising a third longitudinal strengthening section of a length less than that of the stanchion disposed in locked registration inside said space with said stanchion by means of longitudinally disposed ridge and groove structure and disposed at a position along the length of the stanchion receiving heavy stress.

4. The stanchion defined in claim 1 wherein said two sections further comprise substantially U-shaped cross section members defining a base plate and two extending legs for forming said overlapping portions and containing the ridges and grooves, with the two sections having dimensions that require longitudinal registration of the ridges and grooves by axially sliding the sections end to end.

5. The stanchion of claim 1 in which said sections are two metal sections held together in a non-welded assembly in which weight-bearing strength for retaining said goods is substantially produced by the mated ridge and groove structure.

6. A stanchion for retaining goods on a platform of a vehicle formed of at least two shaped aluminum sections interlocked longitudinally by a plurality of mating weight-bearing means including ridges and grooves along two opposed sides of a substantially rectangular configuration to form a unitary load bearing unit surrounding a hollow interior.

* * * * *